March 22, 1932. H. L. FISCHER Re. 18,392

PENCIL

Original Filed Dec. 17, 1918

Inventor

Howard L. Fischer

Reissued Mar. 22, 1932

Re. 18,392

UNITED STATES PATENT OFFICE

HOWARD L. FISCHER, OF ST. PAUL, MINNESOTA, ASSIGNOR TO BROWN & BIGELOW, OF ST. PAUL, MINNESOTA, A CORPORATION OF MINNESOTA

PENCIL

Original No, 1,389,426, dated August 30, 1921, Serial No. 267,206, filed December 17, 1918. Application for reissue filed April 12, 1923. Serial No. 631,720.

This invention relates to a pencil which is particularly adapted to use a marking lead of a very small diameter but of a considerable length so that the marking lead held in writing position can be readily ejected or released and pushed back into the pencil casing to protect the same. The pencil does not require any sharpening, owing to the small diameter of the marking lead and does not shorten in use. The primary object of this invention is to provide a socket or holding means for the marking lead held in writing position, which will allow the ejecting means to eject the entire marking lead out of the pencil casing.

A further object of this invention is in means for automatically resetting the socket in position, or in readiness to receive the rear end of a new marking lead. The construction of this pencil is such that the body portion of the marking lead is held unsupported in the pencil casing, while the barrel of the pencil supports the marking lead in close proximity to the writing end of the marking lead, and the socket, which is connected to the ejecting means, holds and supports the rear end of the marking lead in writing position.

In the drawings forming part of this specification:

Figure 1:
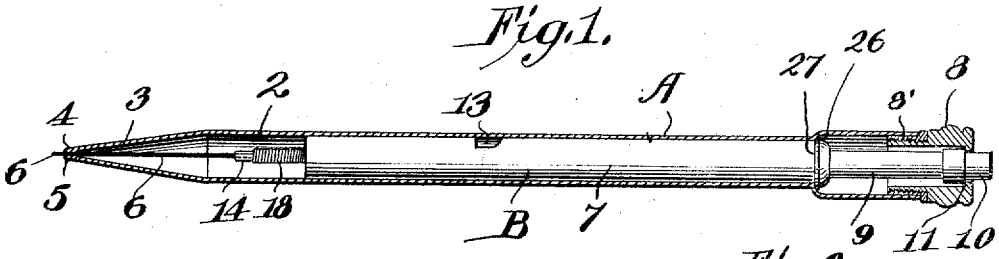
Figure 1 is a side elevation of the pencil, illustrating a portion thereof in cross section.

In the drawings, A represents a pencil having a tubular barrel 2 with a conical forward end 3, the apex 4 of which is formed with an axial opening 5. The opening 5 is approximately the same size and shape as the cross section of a marking lead 6, which is adapted to be used in this pencil.

A propelling mechanism B, which is inclosed in the housing 7, is adapted to be held removable and in position for operation in the pencil barrel 2 by means of the removable head or cap 8 the threaded portion of which engages the threaded portion 8′ in the rear end of the barrel 2. The propelling mechanism in the housing 7 is of any ordinary construction such as illustrated in Patent No. 1,349,950, Aug. 17, 1920, and is operated by the pusher rod 9, the cap 10 of which projects through an opening 11 in the head 8 so that the cap can be engaged and reciprocated to reciprocate the pusher rod 9, and in turn operate the propelling mechanism in the housing 7.

When the propelling mechanism is operated, the ejector rod 12 of the same is operated to move the same in a forward direction a step at a time, and a releasing means 13 is adapted to release the ejector rod so as to allow the ejector rod 12 to be pushed in a backward direction when it is desired to reset the same for a new operation, or to allow the marking lead 6 to be moved in a backward direction when held in writing position in the pencil A.

Figure 3:
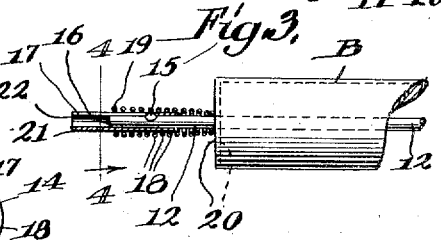
Fig. 3 is an enlarged view of a portion of the pencil partly illustrated in cross section.
Figure 4:
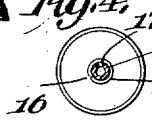
Fig. 4 is a view on the line 4—4 of Fig. 3.
Figure 5:
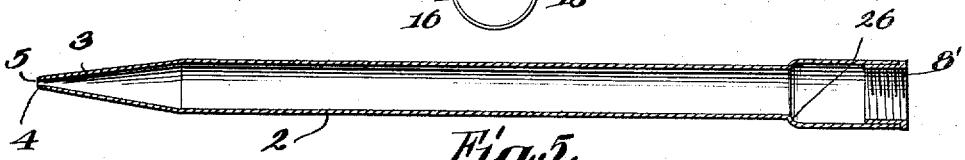
Fig. 5 is a longitudinal cross section of the pencil barrel.
Figure 7:
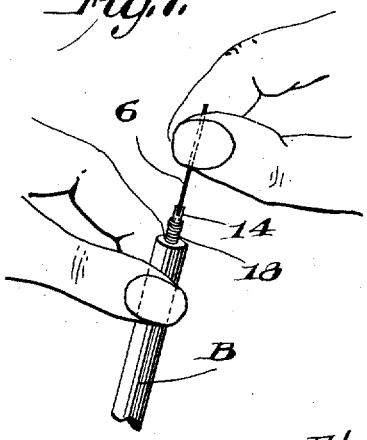
Fig. 7 is a perspective view of a portion of the pencil mechanism, illustrating the manner in which a new marking lead is inserted in the holding socket.

A socket 14 is slidably held on the outer or free end of the ejecting rod 12, the socket 14 being held against disengagement from the ejector rod 12 by means of the projecting lug 15 which is formed a short distance back of the forward or free end 16 of the ejecting rod 12 and which engages in the longitudinally extending slot 17 formed in the spring jawed socket 14. A coil spring 18 is soldered, or otherwise fixed at its forward end at 19 to the tubular socket 14, while the free end of the spring 18 is adapted to engage against the washer-like end 20 of the housing 7, when the ejector rod 12 is set in a backward position, as illustrated in Figs. 1, 3 and 7. The coil spring 18 is strong enough to hold the socket 14, with its forward end 21, projecting beyond the end 16 of the ejector rod 12, as illustrated in Fig. 3, thus forming a recess 22 which is adapted to receive the marking lead 6 to hold the same frictionally tight in the socket 14.

Figure 6:
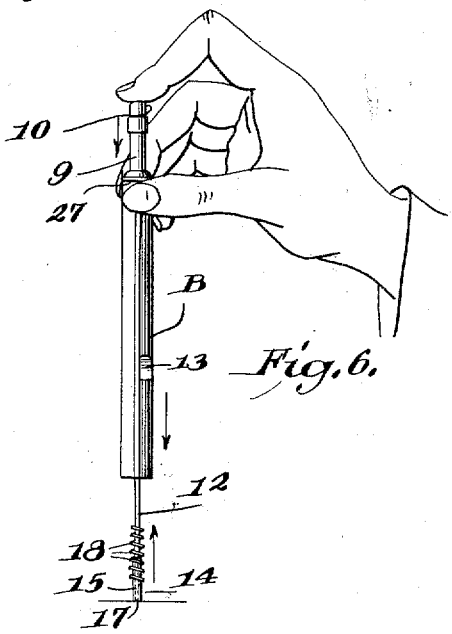
Fig. 6 illustrates the manner in which the ejecting means is reset in a backward position ready for a new operation.

In operation, the marking lead 6, which is held in writing position in the manner illustrated in Fig. 1, is propelled a step at a time by the propelling mechanism out of the writing end or apex 4 of the pencil barrel, and when the marking lead 6 is used up enough so as to cause the end 21 of the socket 14 to engage against the inner surface of the conical end 3, the socket 14 is held stationary while the ejector rod 12 can be operated by the propelling mechanism to slide forward through the recess 22 to eject the rear or butt end of the marking lead 6, allowing the end 16 of the ejector rod 12 to be extended clear through the socket 14 and through the opening 5, to entirely eject all of the marking lead. In this manner, practically the entire marking lead can be used up by the pencil A. It will be noted that when the ejecting rod 12 is in forward position, the spring 18 is out of engagement with the end 20 of the casing 7 and the socket 14 is only frictionally held, either by the rear coils of the spring 18 or by the socket itself, to the forward end of the ejecting rod, but when the ejecting rod is reset by holding the casing 7 between the thumb and middle finger, in the manner illustrated in Fig. 6, and first releasing the propelling mechanism by pressing on the cap 10 with the index finger and then exerting pressure against the socket 14 and end 16, the ejector rod 12 is easily pushed into backward position, compressing the spring 18 against the end 20 of the casing 7. As soon as the resetting pressure is removed from the socket 14 and the end 16 of the ejector rod 12, the spring 18, expanding, forces the socket 14 forwardly on the ejector rod 12 to the position illustrated in Fig. 3 and holds the same in this position against the backward pressure upon the socket 14 incident to the insertion of a lead thereinto, so that said socket will not move in a backward direction on the ejector rod 12 when a new marking lead is inserted in the forward end of the socket in the recess 22. This feature is important, as it is desirable to have a considerable pressure against the socket 14 to hold it in outer position when it is desired to insert a new marking lead, otherwise, if the spring 18 were weak, when the marking lead is inserted in the recess 22, the frictional engagement between the socket and the rear end of the lead would cause the socket to move backward, and thus not allow the rear end of the marking lead to be brought into contact with the end 16 of the ejecting rod 12, and remain there during the entire ejecting stroke of the ejector rod 12. If the spring 18 compresses and allows the socket 14 to slip backward while the lead 6 is being inserted in the recess 22, upon releasing inserting pressure from the lead 6, the spring 18 would push the socket out and leave a space between the end 16 and the rear end of the marking lead, thus allowing the lead to have a slight play when held in writing position. This would not be practical, and is undesirable, as the lead should be held rigid against backward movement when writing with the same.

It is desirable not to have any pressure on the spring 18 when the end 21 of the socket 14 is engaging against the inner conical surface or apex of the pencil barrel, as this would interfere with the propelling mechanism in the housing 7, and would prevent the ejecting rod 12 from having its end 16 freely propelled through the recess 22 of the socket, and the opening 5 in the pencil barrel, while the slight friction of the socket or rear coils of the spring 18 would not interfere with this, and would be desirable to hold the socket in position on the forward end of the ejecting rod, after the rear coils of the spring 18 become disengaged from the washer-like end 20 of the housing 7.

Figure 2:
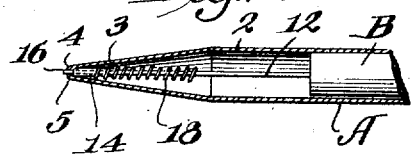
Fig. 2 is a detail of a portion of the pencil partly illustrated in cross section, and illustrating a portion of the parts in a different position.
Figure 8:
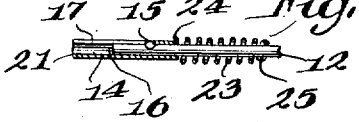
Fig. 8 is a detail partly in cross section of an alternative construction of lead holding socket.

In the alternative construction of socket 14, illustrated in Fig. 8, the spring 23 has its forward end secured to the rear of the socket 14 rigidly at 24, and the rear coils of the spring are rigidly secured at 25 to the ejector rod 12. In this construction, the spring 23 exerts a spring pressure against the socket 14 to hold it in outer position at all times, but the spring 23 is weak enough to allow the same to be compressed by the propelling mechanism when the forward edge 21 of the socket is carried by the ejector rod 12 into the position illustrated in Fig. 2, and allow the end 16 of the ejecting rod to pass through the socket or recess 22 and through the opening 5, to entirely and completely eject the marking lead.

In the preferred construction of the sliding socket and spring illustrated in Figs. 1 to 4 and 5 and 6 of the drawings, the sliding socket, as hereinbefore explained, is adjusted automatically to the position illustrated in Fig. 3 to receive the new marking lead, by the spring 18 when the ejector rod is reset in backward position.

In accordance with the patent statutes, I have described the principles of operation of my invention, together with the apparatus which I now consider to represent the best embodiment thereof, but I desire to have it understood that the construction is only illustrative, and that the invention can be carried out by other means and applied to uses other than those above set forth within the scope of the following claims:

1. In a pencil of the class described, having a propelling means, and an ejector rod connected to said propelling means, a lead holding socket slidable on said rod, and means for automatically setting said socket in receiving position on said ejector rod after said rod is set in backward position, the end of said rod, which forms an abutment for the marking lead held in said socket, being movable longitudinally in said socket to eject the marking lead out of said socket and pencil for the purposes specified.

2. In a pencil of the class described having a barrel, removable propelling means held in said barrel, an ejector rod connected to said propelling means which is adapted to be moved forward a step at a time by said propelling means, and releasing means for releasing said ejector rod to allow the ejector rod of said propelling means to be moved in a backward direction, a slidable socket for holding a marking lead to said ejector rod and means for holding said slidable socket against disengagement from said ejector rod, whereby the marking lead can be held by said socket and propelled a step at a time out of said pencil barrel and said slidable socket will allow said ejector rod to eject all of the lead held in writing position out of said pencil by said propelling means.

3. In a pencil having a tubular barrel, a conical forward end, an axial opening extending through the apex of said conical end of approximately the same size as the cross section of the marking lead to be used therein, propelling means including an ejector rod removably held in said pencil barrel, and releasing means to allow said ejector rod to be moved in a backward direction, a lead holding socket slidably connected to said ejector rod, means for automatically setting said lead holding socket in position on said ejector rod to receive a new marking lead, and means for holding said socket against disengagement from said ejector rod for the purposes specified.

4. In a pencil having a propelling means, a lead ejecting means and a releasing means for said lead ejecting means to allow the ejecting means to be moved in a backward direction, a slidable lead holding socket connected to said ejecting means and means for automatically setting and holding, against backward movement, said socket in receiving position to receive a new marking lead when said ejecting means is set in extreme backward position, said socket holding means diminishing in holding power, as said ejecting means is moved in a forward direction in said pencil, so that when said lead holding socket engages the inner surface of the pencil barrel, said ejecting means can slide in said socket with only a slight degree of friction or holding force from said holding means bearing against said ejecting means, said ejecting means forming an abutment for the rear end of the marking lead held in the socket to rigidly hold the lead against backward movement when held in writing position.

5. In a pencil having a barrel, a removable propelling means held in said barrel, an ejector element connected to said propelling means which is adapted to be moved a step at a time in a forward direction in said pencil barrel, and releasing means for allowing said ejector element to be moved in a backward direction, a slidable lead holding socket carried by said element and means for automatically setting said socket in receiving or forward position on said element for the purposes specified.

6. In a pencil having a hollow tubular barrel, a propelling means adapted to be removably inclosed in said barrel, an ejector element connected to said propelling means which is adapted to be moved a step at a time in one direction longitudinally in said pencil barrel, and releasing means for allowing said element to be moved in a backward direction, a slidable lead receiving socket carried by said element, means for holding said socket against disengagement from said element and resilient means for holding said socket in a forward direction, but allowing said element to be moved longitudinally in said socket to eject the marking lead held by said socket completely out of said pencil and socket by said element, said element forming a rigid abutment for said marking lead when said socket is in its forward position on said element.

7. In a pencil having a hollow barrel, a member removably mounted in said barrel forming a propelling means, an ejector rod connected to said propelling means, said ejector rod being adapted to be moved longitudinally in said barrel in a forward direction and also in a rearward direction, a lead-receiving socket member carried by said rod and spring-held thereto and projecting therebeyond for holding a marking lead so that said lead may be projected out of the forward end of said barrel, said rod forming an abutment in direct contact with the rear end of said marking lead, and said lead-receiving socket being removable with said propelling means and said ejector rod.

8. In a pencil of the class described having a propelling means, and an ejector rod therein, a slidable lead holding socket carried by said rod and adapted to project beyond the same, means for holding said socket against disengagement from said ejector rod, means acting to exert pressure longitudinally on said socket to set the socket in lead receiving position when said rod is set in extreme rearward position, said means being inactive to exert longitudinal pressure on the socket when said rod approaches its foremost position so that when the socket engages the inner surface of the pencil barrel, the rod can slide in the socket free from longitudinal pressure by said means, and said rod forming an abutment for the rear end of the marking lead held in the socket to rigidly hold the lead against backward movement when held in writing position.

9. In a pencil, a barrel having a propelling means removably held in said barrel, an ejector rod connected to said propelling means which is adapted to be moved a step at a time in a forward direction, and releasing means allowing said ejector rod to be moved in a backward direction, means on said ejector rod for holding a marking lead so that all of said lead may be ejected out of the forward end of said pencil, said lead holding means on said rod being removable with said ejecting mechanism and said ejector rod.

HOWARD L. FISCHER.